Figure 1:
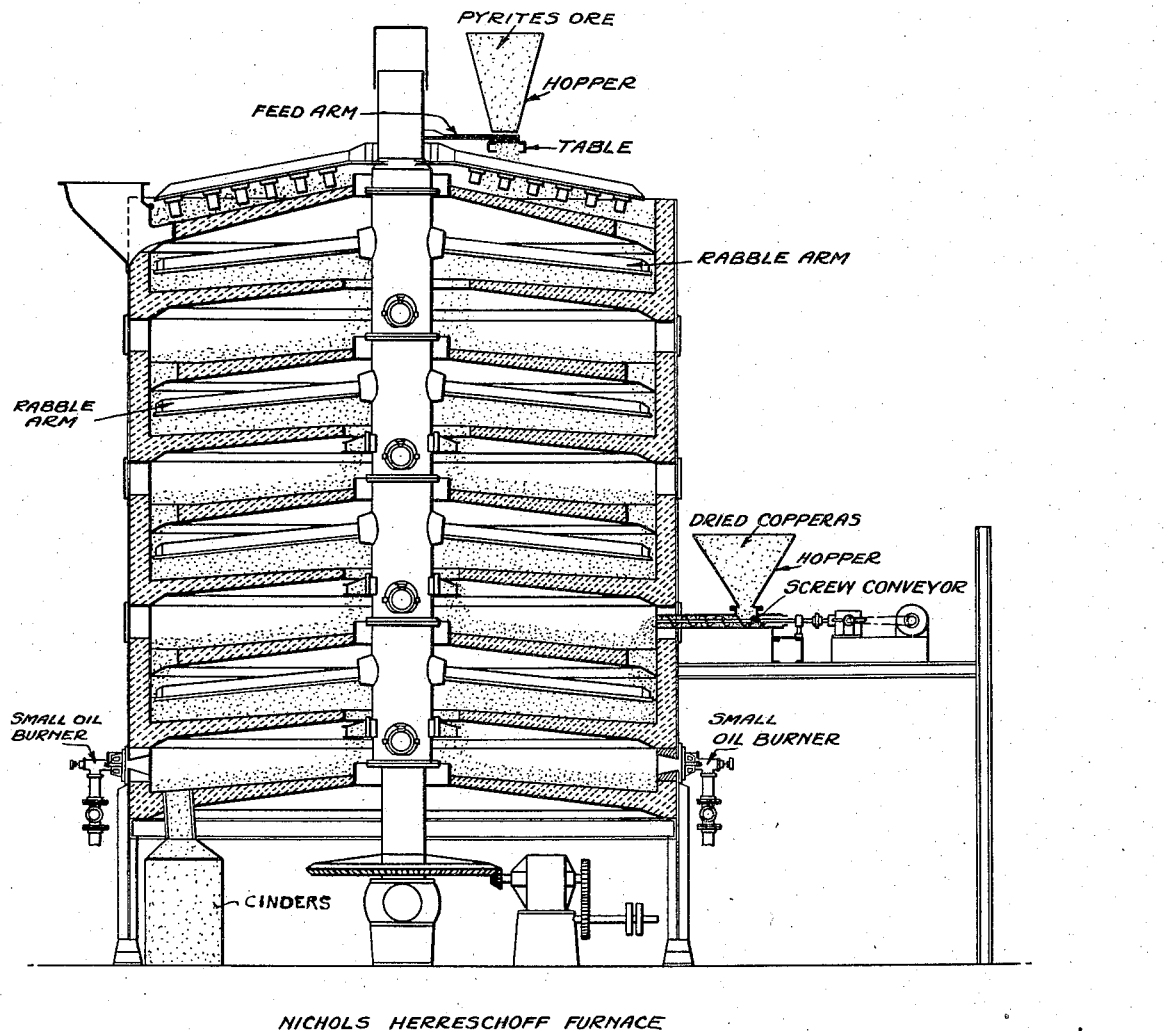

Aug. 17, 1937.  W. HARDIEK  2,090,388
ORE TREATMENT
Filed July 20, 1935  2 Sheets-Sheet 1

Inventor
WILLIAM HARDIEK,
By Hervey Love Clarke
his Attorney

Aug. 17, 1937.  W. HARDIEK  2,090,388
ORE TREATMENT
Filed July 20, 1935  2 Sheets-Sheet 2
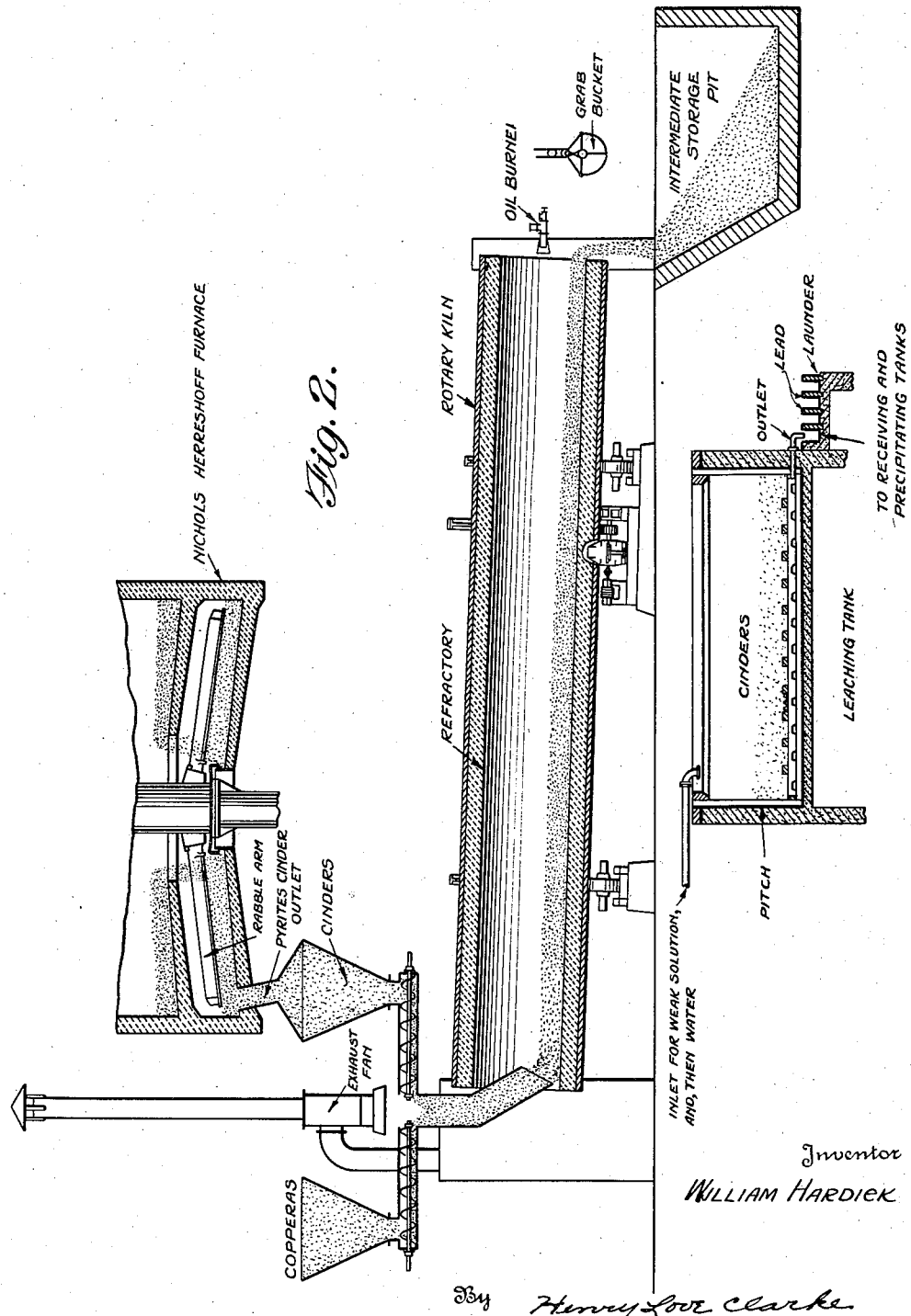

Patented Aug. 17, 1937

2,090,388

UNITED STATES PATENT OFFICE 2,090,388

ORE TREATMENT

William Hardiek, Baltimore, Md., assignor, by mesne assignments, to The Davison Chemical Corporation, a corporation of Maryland Application July 20, 1935, Serial No. 32,350

3 Claims. (Cl. 75—116)

This invention relates in general to recovery of extraneous metals like cobalt, nickel, copper, zinc, etc. from ores containing same, and more particularly relates to a simple and effective method for increasing the percentage of solubility of such metals that are present in ore, especially in sulphide ore, pyrites and the like, and an object of the invention is to obtain an increase in the solubility percentage of such metals from the cinder residue resulting from the roasting operation of ores containing such metals to reduce the percentage of such metals in the finally treated ore. The invention has for further objects such other improvements and advantages in operation or result as may be found to obtain in the method hereinafter described or claimed.

In its broadest scope this invention comprehends treating ores (roasted or during roasting) containing the above-mentioned metals by means of heat and a sulphate of a different metal from the metallic values to be affected thereby and which is decomposable by means of heat treatment. The ore and the sulphate are comminuted and mixed prior to or during the heat treatment. This processing effects pyrolysis of the sulphates and transfers metals of the type mentioned above into sulphates, which are then recovered by means of water leaching. The leaching may also be done with an acid solution, which under conditions will enhance the solubility of the metals. The resulting sulphate solution is treated in any well known manner to recover the metal values.

In recovering only copper from sulphate solutions, the copper is precipitated as cement copper by means of scrap iron. When cobalt, nickel and zinc are present, in addition to copper, the following method may be employed. The pH of the solution is adjusted by means of alkali addition, as for instance, soda ash solution, so that the iron is first precipitated. On increasing the alkalinity the copper is thrown out. Subsequently by means of oxidation, using chlorine or hypochlorites as oxidants, the cobalt is thrown out in the form of cobaltic hydrate. After the cobalt has been removed the alkalinity is increased still further, which has the effect of precipitating the nickel content as hydrate. Any zinc present may be removed by final adjustment of the pH to suitable point when the zinc also comes out as hydrate or basic carbonate. The above manner of recovery of the metals from the sulphate solution is not a distinctive part of this invention, but is given for the purpose of completeness.

The invention is of particular application in connection with the reduction of the percentage of such metal values in, and their recovery from, the roast residues of sulphide ores, as for instance, iron pyrites containing small amounts of metals of the type mentioned above.

The invention is, however, not limited to sulphide ores, but is also applicable to other ores like silicates, carbonates, oxides, etc. The ore, crushed and ground to a fineness to pass a screen of approximately 4 mesh, although grinding to —14 mesh is preferable, is mixed with the sulphate, which should be of the same fineness, or finer. Sulphates that may be used in the process are those of other metals which decompose or dissociate within the roasting temperature range used in roasting the ore. The preferred sulphate is copperas or ferrous sulphate. To effect heat economy in the roasting operation the copperas is preferably dehydrated to approximately the monohydrate. Other sulphates that may be used are sulphates of other metals or metallic-like compounds, ferric sulphate, aluminum sulphate, titanium sulphate, and ammonium sulphate is included within the definition of the term as used herein.

When treating sulphide ores that are very high in sulphur content it is preferable to add the sulphate after the ore has been substantially roasted to oxidize and drive off substantially most of the sulphur. The residue is then mixed with ferrous sulphate and given a secondary roasting. In case of ferrous sulphate the temperature used is approximately 500 to 600° C. At this temperature substantially all of the ferrous sulphate is decomposed.

In roasting iron pyrites in a Herreshoff furnace for the production of $SO_2$ and sulphuric acid therefrom, I have found that it is advantageous to combine the two roasting operations in one apparatus. Preferably, therefore, as illustrated in Fig. 1 of the accompanying drawings, the ferrous sulphate is introduced on the third or fourth lowest hearth of the burner, which is a region in the ore roasting operation where substantially most of the sulphur in the original pyrites has been driven off. In this manner substantial extraneous heating for the roasting with ferrous sulphate is obviated, as the charge on this lower shelf is still sufficiently hot to produce the desired reaction, with, if necessary, very little augmentation by supplemental externally supplied heat.

In such furnace the ore to be roasted is introduced at the top and is caused to flow downwardly through the furnace over the shelves in series, the flow being toward the center on alternate shelves and toward the periphery on intermediate shelves, such flow being effected by the usual rabbles which simultaneously agitate or rack the ore during its flow, and the ore is concurrently oxidized by combustion of its sulphur.

The ferrous sulphate is fed in at a predetermined rate by means of a screw conveyor. To facilitate the mixing of the copperas and the pyrites cinder on the hearth where the copperas is introduced one or two of the rabble teeth are arranged for back rabbling. Instead of mixing the sulphate in the lower shelves of the roasting furnace, the cinder from the roasting operation is, alternatively, conveyed to a kiln, as illustrated in Fig. 2, and there treated with the sulphate in dry state and then the metal values subsequently recovered from the cinder.

It is of advantage to burn out as much sulphur as possible from the pyrites prior to the addition of the ferrous sulphate, otherwise an unnecessary excess of copperas is consumed in oxidizing the remaining sulphides. The cinder should preferably not contain more than 3% sulphur, when the FeSO4 is added.

I am not in a position to give any positive theory or explanation as to why this process is successful, but I offer the following merely as a plausible explanation. When the iron sulphate is decomposed by heat in the presence of the ore, it is quite possible that the negative radical is very active due to its nascent state and reacts with the copper, cobalt, nickel and zinc forming sulphates therewith.

If most of the sulphur is not burned out of the iron pyrites prior to the addition of the ferrous sulphate the amount of ferrous sulphate used has to be increased very considerably on account of the reducing action of the excessive amount of sulphide or bisulphide present. In roasting copperas to SO2 for sulphuric acid production, however, a certain quantity of cobalt, nickel, or copper containing pyrites can be added to make these metallic values soluble in the cinder produced.

The following are specific examples of my process, it being understood, however, that they are merely illustrative of the working of the process.

A cobalt and copper containing iron pyrites of the following composition was used:

|  | Per cent |
|---|---|
| Fe | 46.66 |
| S | 46.26 |
| SiO2 | 1.26 |
| Co | 1.03 |
| Cu | 0.99 |

This pyrites was roasted to a cinder of the following composition:

|  | Per cent |
|---|---|
| Sulphide sulphur | 1.10 |
| Cobalt | 1.43 |
| Copper | 1.52 |

This cinder was mixed with various percentages of ferrous sulphate monohydrate and heated to a temperature of approximately 550° C. for about 30 minutes. In the original cinder the copper solubility was 55% and the cobalt solubility 24%. It will be seen from this that the cobalt is the more refractory of the two metals. On heating the cinder with 5% ferrous sulphate monohydrate, under above specified conditions, the solubility of the copper rose to 73% and the cobalt to 54%. With a 10% sulphate addition the copper solubility was 79% and the cobalt solubility 65%. With 20% addition of sulphate the copper solubility was 88% and the cobalt solubility 91%.

The advantage of burning out most of the sulphur from the pyrites prior to the copperas treatment is apparent from the results of the following run with unburned pyrites using 20% ferrous sulphate monohydrate on the basis of the amount of pyrites used. The copper solubility was 56% and the cobalt solubility 26%. These two solubilities are approximately the same as the solubility in the original cinder without any copperas treatment.

To have the copperas effective on the original ore it is necessary to use approximately three times as much copperas as pyrites. The apparent reason for this is that the sulphide exerts a reducing action on the copperas so that a large proportion of the copperas is destroyed before it has any chance to act upon the cobalt and copper sulphides.

The use of ferric sulphate is somewhat more efficient than the ferrous sulphate, but under present market conditions the price of the ferrous salt is so much lower than the ferric salt that the use of the latter is less economical. As an example of the effect of ferric salt, however, the following is illustrative: ferric sulphate to the extent of 7.5% of the weight of the cinder mentioned above was used and the resulting solubilities showed as follows:

|  | Per cent |
|---|---|
| Copper | 78 |
| Cobalt | 70 |

It is of advantage to treat the pyrites cinder immediately after the preliminary roasting, as otherwise some of the metal values, especially copper, have a tendency to revert into compounds which are more refractory.

In treating other ores like silicates, carbonates, oxides, etc., which are roasted by externally applied heat rather than combustion of the ore, as in the case of sulphide ore, the sulphate is added to the ore to be roasted prior to entering the roasting step and the sulphate decomposed during the roasting of the ore.

The invention as hereinabove set forth is embodied and practiced in particular manners but may be variously embodied and practiced within the scope of the following claims.

I claim:

1. A method of recovering copper and cobalt from ore comprised primarily of iron sulphide, comprising: roasting the ore to burn the sulphur out of the ore; mixing iron sulphate with the ore in the course of the roasting in the form of sulphate solids when most of the sulphur has been burned off to the extent that the sulphide content of the ore exerts no substantial amount of reducing action on the iron sulphate and the ore is still hot enough to effect a reaction of the sulphate radical of the added iron sulphate with the cobalt and copper to convert them to soluble form in the course of the subsequent completion of the roasting by combustion of the residual sulphur of the ore with little if any augmentation of supplemental externally supplied heat; and subsequently recovering the soluble cobalt and copper values from the completely roasted ore.

2. A method of recovering copper and cobalt from ore comprised primarily of iron sulphide, comprising: flowing the ore downwardly in series over superposed shelves alternately in opposite direction over adjacent shelves while stirring the ore on the shelves and roasting the ore during its flow over the shelves; mixing iron sulphate with the ore in the course of the roasting in the form of sulphate solids at one of the lowermost shelves where most of the sulphur has been burned off to the extent that the sulphide content of the ore exerts no substantial amount of reducing action on the iron sulphate and the ore is still hot enough to effect a reaction of the sulphate radical with the cobalt and copper to convert them to soluble form in the course of the subsequent completion of the roasting by combustion of the residual sulphur of the ore while flowing over the lowermost shelves with little if any augmentation of supplemental externally supplied heat; and thereafter recovering the soluble cobalt and copper from the ore discharged from said lowermost shelves.

3. A method of recovering copper and cobalt from ore comprised primarily of iron sulphide, comprising: flowing the ore downwardly in series over superposed shelves alternately in opposite direction over adjacent shelves while stirring the ore on the shelves and roasting the ore during its flow over the shelves; mixing iron sulphate with the ore in the course of the roasting in the form of sulphate solids at one of the lowermost shelves where most of the sulphur has been burned off to the extent of containing not more than 3% sulphur so that the sulphide content of the ore exerts no substantial amount of reducing action on the iron sulphate and the ore is still hot enough to effect a reaction of the sulphate radical with the cobalt and copper to convert them to soluble form in the course of the subsequent completion of the roasting by combustion of the residual sulphur of the ore while flowing over the lowermost shelves with little if any augmentation of supplemental externally supplied heat; and thereafter recovering the soluble cobalt and copper from the ore discharged from said lowermost shelves.

WILLIAM HARDIEK.